United States Patent Office 3,367,856
Patented Feb. 6, 1968

3,367,856
REARRANGEMENT OF ARYLSILANES
Lee E. Nelson and Donald R. Weyenberg, Midland, Mich., assignors to Dow Corning Corporation, Midland, Mich., a corporation of Michigan
No Drawing. Filed Feb. 7, 1963, Ser. No. 256,811
22 Claims. (Cl. 204—158)

This invention relates to a method for rearranging arylsilanes. More particularly, this invention relates to a method for rearranging arysilanes employing a free radical generator as a catalyst.

The method of this invention is useful for producing arylsilanes having a more desirable structure from arylsilanes which are available but do not have the desired structure.

The method of this invention also provides a useful means for preparing arylsilanes which may not be readily prepared by other means.

It has been discovered in accordance with this invention that arylsilanes of the general formula

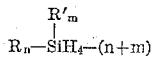

wherein R is an aryl group, R' is an alkyl group, $n$ is an integer from 1 to 3 inclusive, $m$ is an integer from 0 to 2 inclusive, and $n+m$ is equal to no more than 3, will undergo rearrangment at a temperature of not more than 200° C. in the presence of a free radical generator as a catalyst.

It has also been discovered in accordance with this invention that a mixture of silanes having the formulas $R_xSiR'_m$ and $R'_mSiH_y$ wherein R, R' and $m$ have the above defined meanings and $x$ and $y$ are integers from 2 to 4 inclusive, will undergo rearrangement at a temperature of not more than 200° C. in the presence of a free radical generator as a catalyst.

R can be any aryl group such as phenyl, naphthyl, anthracyl or phenanthryl. It is preferred that R be selected from the group consisting of the phenyl group, alkyl-substituted phenyl groups and the xenyl group. The number of carbon atoms in the alkyl group R' is not particularly critical. However, alkyl groups containing 1 to 18 inclusive carbon atoms are preferred. Examples of suitable alkyl groups are the methyl, ethyl, propyl, isopropyl, butyl, amyl, octyl, decyl, dodecyl, pentadecyl and octadecyl groups. Likewise, the size of the alkyl substituent on the phenyl group is not particularly critical. Moreover, more than one alkyl substituent may be present on the phenyl group. Thus, the alkyl-substituted phenyl group could be xylyl, mesityl or pseudocumyl as well as tolyl.

Rearrangement or redistribution occurs only if both an aryl group and a hydrogen atom are attached to the same silicon atom of a silane or, rearrangement occurs between a mixture of silanes having at least two aryl groups attached to the same silicon atom and silanes having at least two hydrogen atoms attached to the same silicon atom. The rearrangement is specific for arylhydrogen exchange. No rearrangement occurs in two-component silane systems in which there is only one silicon-aryl and only one silicon-hydrogen bond on different silicon atoms nor will rearrangement occur with silanes which contain only alkyl groups and a silicon-hydrogen bond. Rearrangement proceeds to a greater extent as the number of hydrogens on the silicon is increased. Replacement of a hydrogen by an aryl group such as a phenyl group decreases the extent of rearrangement slightly, whereas replacement of a hydrogen by an alkyl group decreases the extent of rearrangement considerably. The presence of a chlorine atom, an alkoxy group or a siloxane linkage on the silicon completely inhibits the redistribution reaction regardless of what other substituents are on the silicon.

Is is believed that rearrangement reactions occur with a reasonable efficiency because silyl radicals are formed via hydrogen abstraction and, that the silyl radicals thus formed possess enough energy to displace a silicon atom from an aryl group. However, the invention is not limited to this explanation.

Suitable free radical generators which may be used to catalyze the rearrangement are the peroxides, azonitriles, electromagnetic radiation such as X-rays, gamma rays and ultra-violet light. The most efficient peroxide catalysts are the dialkylperoxides such as di-t-butylperoxide and 2,5-dimethyl-2,5-di-t-butylperoxyhexane which are the least prone to induced decomposition. Other free radical generators such as t-butylperbenzoate, benzoylperoxide and 2,2'-azobis(2-methylpropionitrile) can also be used. The generation of the free radicals may also be accomplished by the use of high energy electrons or radioactive materials such as cobalt 60, however, the use of peroxides is preferred.

The amount of catalyst used is not particularly critical. Varying the amount of catalyst merely affects the rate and the extent of the rearrangement. Thus, the same extent of rearrangement may be achieved by using smaller amounts of the catalyst and heating the mixture for a longer time and/or at a higher temperature. For example, tests conducted show that when amounts ranging from less than 0.25 percent to more than 5.0 percent by weight of the peroxide were used, based on the weight of the silane, a substantial amount of rearrangement was always obtained but that the extent of rearrangement was slightly greater as the amount of peroxide used increased.

The temperature at which the rearrangement is carried out will depend upon the particular catalyst being employed. For example, when a peroxide or ultra-violet light is used, a temperature within the range of 50–200° C. is preferred whereas when other electromagnetic radiations are used, temperatures below room temperature can be employed.

If so desired, the rearrangement can be carried out in a suitable solvent. The solvent can be, for example, an aromatic or aliphatic solvent. Suitable solvents that can be used are toluene, xylene, benzene, naphtha, mineral spirits, octane, nonane and Skellysolve L solvent (mixed octanes having a distillation range of about 105 to 140° C.). If a solvent is used, it is preferred that an aromatic solvent such as toluene be employed.

Any suitable apparatus can be used to carry out the rearrangement.

A Varian Model A–60 High Resolution Proton Magnetic Resonance Spectrometer was used to analyze the products of the rearrangement reactions. In some instances the products of the rearrangement reactions were also analyzed on an F and M Vapor Phase Chromatography Model 300 apparatus.

The following examples are set forth as being illustrative of the invention but should not be construed as limiting thereto.

*Example 1*

A solution of di-t-butylperoxide in diphenylsilane was prepared by adding 0.0077 g. of di-t-butylperoxide to 0.7756 g. of diphenylsilane. The solution was sealed in a Pyrex glass NMR tube and heated in a constant temperature bath at 130° C. for 1 hour and 20 minutes. Nuclear Magnetic Resonance (NMR) and Vapor Phase Chromatography (VPC) analysis of the tube contents showed considerable amounts of rearrangement products. The following mole percents of the various silanes were observed: triphenylsilane—40.0 percent, diphenylsilane—

35.0 percent, phenylsilane—20.0 percent, silane—5.0 percent and tetraphenylsilane—trace by Vapor Phase Chromatography.

Example 2

Under identical conditions to those used in Example 1, a sample of diphenylsilane without the di-t-butylperoxide catalyst did not show any evidence of rearrangement. This example shows that a free radical generator is necessary for the rearrangement to take place.

Example 3

A solution of di-t-butylperoxide in phenylmethylsilane was prepared by adding 0.0062 g. of di-t-butylperoxide to 0.3092 g. of phenylmethylsilane. The solution was sealed in a Pyrex glass NMR tube and heated in a constant temperature bath at 160° C. for 1 hour. NMR and VPC analysis of the tube contents showed that the following mole percents of following silanes were present: diphenylmethylsilane—35 percent, phenylmethylsilane—44 percent, methylsilane—21 percent and triphenylmethylsilane—trace.

Example 4

A solution of di-t-butylperoxide in diphenylmethylsilane was prepared by adding 0.0050 g. of di-t-butylperoxide to 0.4967 g. of diphenylmethylsilane. The solution was sealed in a Pyrex glass NMR tube and heated in a constant temperature bath at 160° C. for 1 hour. NMR analysis of the tube contents showed that the following mole percents of the following silanes were present: triphenylmethylsilane—25 percent, diphenylmethylsilane—53 percent and phenylmethylsilane—18 percent.

Example 5

A solution of di-t-butylperoxide in phenyldimethylsilane was prepared by adding 0.0032 g. of di-t-butylperoxide to 0.3194 g. of phenyldimethylsilane. The solution was sealed in a Pyrex glass NMR tube and heated in a constant temperature bath at 160° C. for 1 hour and 40 minutes. NMR analysis of the tube contents showed that the following mole percents of the following silanes were present: diphenyldimethylsilane—19 percent, phenyldimethylsilane—72 percent and dimethylsilane—9 percent.

The following two examples show that both a hydrogen atom and an aromatic group must be attached to the silicon atom for rearrangement to take place.

Example 6

A solution of di-t-butylperoxide in benzyldimethylsilane was prepared by adding 0.0102 g. of di-t-butylperoxide to 0.3044 g. of benzyldimethylsilane. The solution was sealed in a Pyrex glass NMR tube and heated in a constant temperature bath at 160° C. for 1 hour. NMR analysis did not show any evidence of rearrangement.

Example 7

The process of Example 6 was repeated using a solution of 0.0039 g. of di-t-butylperoxide in 0.3623 g. of benzyldimethylsilane. As in the above example, NMR analysis did not show any evidence of rearrangement.

The following example shows that both a hydrogen atom and an aromatic group must be attached to the same silicon atom for rearrangement to take place. When only a hydrogen atom (ethyldimethylsilane) is present or only an aromatic group (o-tolydimethylpropylsilane) is present, no rearrangement takes place. This example also shows that the hydrogen atom and aromatic group must be attached to the same silicon atom and that no rearrangement takes place when they are attached to different silicon atoms in a mixture of silanes. This example further shows that when only one hydrogen and only one aromatic group are attached to different silicon atoms in a mixture of silanes, no rearrangement takes place.

Example 8

A solution of di-t-butylperoxide in a mixture of o-tolyldimethylpropylsilane and ethyldimethylsilane was prepared by adding 0.0056 g. of di-t-butylperoxide to 0.0993 g. of o-tolyldimethylpropylsilane and 0.1210 g. of ethyldimethylsilane. The solution was sealed in a Pyrex glass NMR tube and heated in a constant temperature bath at 160° C. for 1 hour. NMR analysis did not show any evidence of rearrangement.

Example 9

0.75 g. of diphenylsilane was placed in a Vycor glass tube and then the tube was sealed. The tube was heated to a temperature of 50–75° C. for 72 hours while being exposed to ultra-violet light from four 1200 watt input ultra-violet arc lamps (GE UA11). The tube and the lamps were enclosed in a steel container during irradiation of the tube. Upon opening the tube the presence of silane was detected by its spontaneous combustion upon contact with the air. NMR analysis of the tube contents showed that the following mole percents of the following silanes were present: triphenylsilane—29 percent, diphenylsilane—58 percent and phenylsilane—13 percent.

Example 10

A solution of di-t-butylperoxide in diphenylsilane was prepared by adding 0.007 g. of di-t-butylperoxide to 0.7756 g. of diphenylsilane. The solution was sealed in a Pyrex glass NMR tube and heated in a constant temperature bath at 130° C. for 1 hour and 20 minutes. NMR analysis of the tube contents showed that the following mole percents for the following silanes were present: triphenylsilane—40 percent, diphenylsilane—40 percent, phenylsilane—17 percent and silane—3 percent.

Example 11

A solution of 2,5-dimethyl-2,5-di-t-butyperoxyhexane in diphenylsilane was prepared by adding 0.0029 g. of 2,5-dimethyl-2,5-di-t-butylperoxyhexane to 0.2910 g. of diphenylsilane. The solution was sealed in a Pyrex glass NMR tube and heated in a constant temperature bath at 130° C. for 1 hour and 20 minutes. NMR analysis of the tube contents showed that the following mole percents of the following silanes were present: triphenylsilane—39 percent, diphenylsilane—40 percent, phenylsilane—18 percent and silane—3 percent.

Example 12

A solution of 2,2'-azobis(2-methylpropionitrile) in diphenylsilane was prepared by adding 0.0038 g. of 2,2'-azobis(2-methylpropionitrile) to 0.3761 g. of diphenylsilane. The solution was sealed in a Pyrex glass NMR tube and heated in a constant temperature bath at 80° C. for 1 hour and 15 minutes. NMR analysis indicated that only about 1 mole percent of phenylsilane and about 1 mole percent of triphenylsilane had been formed. The tube was then heated at 100° C. for an additional 1 hour and 20 minutes. NMR analysis now indicated that about 3 mole percent of phenylsilane and 3 mole percent of triphenylsilane had been formed by rearrangement. The tube was then opened and an additional 0.0038 g. of 2,2'-azobis(2-methylpropionitrile) was added. The tube was again sealed and then heated at 130° C. for 1 hour and 20 minutes. NMR analysis of the tube contents showed that the following mole percents of the following silanes were present: triphenylsilane—14 percent, diphenylsilane—78 percent and phenylsilane—8 percent.

Example 13

A solution of t-butylperbenzoate in diphenylsilane was prepared by adding 0.0035 g. of t-butylperbenzoate to 0.3450 g. of diphenylsilane. The solution was sealed in a Pyrex glass NMR tube and heated in a constant temperature bath at 130° C. for 1 hour and 20 minutes. NMR analysis of the tube contents showed that the following mole percents of the following silanes were present: triphenylsilane—11 percent, diphenylsilane—82 percent and phenylsilane—7 percent.

Example 14

A solution of benzoyl peroxide in diphenylsilane was prepared by adding 0.0034 g. of benzoyl peroxide to 0.3395 g. of diphenylsilane. The solution was sealed in a Pyrex glass NMR tube and heated in a constant temperature bath at 130° C. for 2 hours and 40 minutes. NMR analysis of the tube contents showed that the following mole percents of the following silanes were present: triphenylsilane—7 percent, diphenylsilane—90 percent, phenylsilane—3 percent.

Example 15

A solution of di-t-butylperoxide in phenyldimethylsilane and toluene was prepared by adding 0.0087 g. of di-t-butylperoxide to 0.3606 g. of phenyldimethylsilane and 0.2490 g. of toluene. The solution was sealed in a Pyrex glass NMR tube and heated in a constant temperature bath at 160° C. for 1 hour. NMR analysis of the tube contents showed that 14 mole percent of diphenyldimethylsilane and 12 mole percent of dimethylsilane were formed by rearrangement. There was no rearrangement of the toluene with the phenyldimethylsilane or of the toluene with itself.

Example 16

A solution of 2,5-dimethyl-2,5-di-tbutylperoxyhexane in di-p-tolyldimethylsilane and n-hexylmethylsilane was prepared by adding 0.0081 g. of 2,5-dimethyl-2,5-di-t-butylperoxyhexane to 0.4586 g. of di-p-tolyldimethylsilane and 0.2493 g. of n-hexylmethylsilane. The solution was sealed in a Pyrex glass NMR tube and heated in a constant temperature bath at 170–180° C. for 2 hours. NMR analysis of the tube contents showed that rearrangement had taken place. The tube was then opened and the dimethylsilane formed during the rearrangement escaped as a gas. Analysis of the solution remaining in the tube by VPC showed that the following mole percents of the following silanes were present: n-hexylmethylsilane—32.5 percent, p-tolyldimethylsilane—14.6 percent, p-tolylmethyl - n - hexylsilane—18.4 percent, di-p-tolyldimethylsilane—34.5 percent and di-p-tolylmethyl-n-hexylsilane—trace.

Example 17

A solution of di-t-butylperoxide in diphenylsilane was prepared by adding 0.0190 g. of di-t-butylperoxide to 0.3783 g. of diphenylsilane. The solution was sealed in a Pyrex glass NMR tube and heated in a constant temperature bath at 130° C. for 1 hour and 30 minutes. NMR analysis of the tube contents showed that the following mole percents of the following silanes were present: triphenylsilane—43 percent, diphenylsilane—35 percent, phenylsilane—16 percent and silane—6 percent.

Example 18

A solution of di-t-butylperoxide in diphenylsilane was prepared by adding 0.0073 g. of di-t-butylperoxide to 0.3669 g. of diphenylsilane. The solution was sealed in a Pyrex glass NMR tube and heated in a constant temperature bath at 130° C. for 1 hour and 30 minutes. NMR analysis of the tube contents showed that the following mole percents of the following silanes were present: triphenylsilane—39 percent, diphenylsilane—36 percent, phenylsilane—21 percent and silane—4 percent.

Example 19

A solution of di-t-butylperoxide in diphenylsilane was prepared by adding 0.0026 g. of di-t-butylperoxide to 0.4959 g. of diphenylsilane. The solution was sealed in a Pyrex glass NMR tube and heated in a constant temperature bath at 130° C. for 1 hour and 30 minutes. NMR analysis of the tube contents showed that the following mole percents of the following silanes were present: triphenylsilane—32 percent, diphenylsilane—47.5 percent, phenylsilane—18 percent and silane—2.5 percent.

Example 20

A solution of di-t-butylperoxide in diphenylsilane was prepared by adding 0.0011 g. of di-t-butylperoxide to 0.4668 g. of diphenylsilane. The solution was sealed in a Pyrex glass NMR tube and heated in a constant temperature bath at 130° C. for 1 hour and 30 minutes. NMR analysis of the tube contents showed that the following mole percents of the following silanes were present: triphenylsilane—20 percent, diphenylsilane—61.5 percent, phenylsilane—17 percent and silane—1.5 percent.

That which is claimed is:

1. A method for causing a silane of the general formula $$R_nSiH_{4-(n+m)}R'_m$$

wherein R is an aryl group, R' is an alkyl group, $n$ is an integer from 1 to 3 inclusive, $m$ is an integer from 0 to 2 inclusive and $n+m$ is equal to no more than 3, to undergo rearrangement, said method comprising subjecting said silane at a temperature of not more than 200° C. to the action of a chemical free radical generator.

2. The method of claim 1 wherein the rearrangement is carried out in a solvent.

3. A method for causing a silane of the general formula $$R_nSiH_{4-(n+m)}R'_m$$

wherein R is an aryl group, R' is an alkyl group, $n$ is an integer from 1 to 3 inclusive, $m$ is an integer from 0 to 2 inclusive and $n+m$ is equal to no more than 3, to undergo rearrangement, said method comprising heating said silane at a temperature from about 50° to 200° C. in the presence of a peroxide free radical generator.

4. The method of claim 3 wherein said peroxide is selected from the group consisting of di-t-butylperoxide, t-butylperbenzoate, benzoylperoxide and 2,5-dimethyl-2,5-di-t-butylperoxyhexane.

5. The method of claim 4 wherein said peroxide is di-t-butylperoxide.

6. The method of claim 3 wherein the rearrangement is carried out in a solvent.

7. A method of causing a silane of the general formula $$R_nSiH_{4-(n+m)}R'_m$$

wherein R is selected from the group consisting of the phenyl group, alkyl-substituted phenyl groups and the xenyl group, R' is an alkyl group, $n$ is an integer from 1 to 3 inclusive, $m$ is an integer from 0 to 2 inclusive and $n+m$ is equal to no more than 3, to undergo rearrangement, said method comprising heating said silane at a temperature from about 50° to 200° C. in the presence of a peroxide free radical generator.

8. The method of claim 7 wherein the rearrangement is carried out in a solvent.

9. The method of claim 8 wherein the rearrangement is carried out in an aromatic solvent.

10. The method of claim 7 wherein said peroxide is selected from the group consisting of di-t-butylperoxide, t-butylperbenzoate, benzoylperoxide and 2,5-dimethyl-2,5-di-t-butylperoxyhexane.

11. The method of claim 10 wherein said peroxide is di-t-butylperoxide.

12. A method of causing diphenylsilane to undergo rearrangement which comprises heating said diphenylsilane at a temperature from about 130° to 160° C. in the presence of di-t-butylperoxide.

13. A method of causing a silane of the general formula

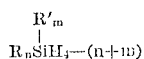

wherein R is selected from the group consisting of the phenyl group, alkyl-substituted phenyl groups and the xenyl group, R' is an alkyl group, $n$ is an integer from 1 to 3 inclusive, $m$ is an integer from 0 to 2 inclusive and $n+m$ is equal to no more than 3, to undergo rearrangement, said method comprising heating said silane at a temperature from about 50° to 200° C. in the presence of ultra-violet light.

14. A method for causing a mixture of silanes having the formulas $R_xSiR'_m$ and $R'_mSiH_y$ wherein R is an aryl group, R' is an alkyl group, $m$ is an integer from 0 to 2 inclusive, $x$ is an integer from 2 to 4 inclusive and $y$ is an integer from 2 to 4 inclusive, to undergo rearrangement, said method comprising subjecting said mixture of silanes at a temperature of not more than 200° C. to the action of a chemical free radical generator.

15. A method for causing a mixture of silanes having the formulas $R_xSiR'_m$ and $R'_mSiH_y$ wherein R is an aryl group, R' is an alkyl group, $m$ is an integer from 0 to 2 inclusive, $x$ is an integer from 2 to 4 inclusive and $y$ is an integer from 2 to 4 inclusive, to undergo rearrangement, said method comprising heating said mixture of silanes at a temperature from about 50° to 200° C. in the presence of a peroxide free radical generator.

16. The method of claim 15 wherein the rearrangement is carried out in a solvent.

17. The method of claim 15 wherein said peroxide is selected from the group consisting of di-t-butylperoxide, t-butylperbenzoate, benzoyl peroxide and 2,5-dimethyl-2,5-di-t-butylperoxyhexane.

18. A method of causing a mixture of silanes having the formulas $R_xSiR'_m$ and $R'_mSiH_y$ wherein R is selected from the group consisting of the phenyl group, alkyl-substituted phenyl groups and the xenyl group, R' is an alkyl group, $m$ is an integer from 0 to 2 inclusive, $x$ is an integer from 2 to 4 inclusive and $y$ is an integer from 2 to 4 inclusive, to undergo rearrangement, said method comprising heating said mixture of silanes at a temperature from about 50° to 200° C. in the presence of a peroxide free radical generator.

19. The method of claim 18 wherein said peroxide is selected from the group consisting of di-t-butylperoxide, t-butylperbenzoate, benzoyl peroxide and 2,5-dimethyl-2,5-di-t-butylperoxyhexane.

20. A method of causing a mixture of silanes having the formulas $R_xSiR'_m$ and $R'_mSiH_y$ wherein R is selected from the group consisting of the phenyl group, alkyl-substituted phenyl groups and the xenyl group, R' is an alkyl group, $m$ is an integer from 0 to 2 inclusive, $x$ is an integer from 2 to 4 inclusive and $y$ is an integer from 2 to 4 inclusive, to undergo rearrangement, said method comprising heating said mixture of silanes at a temperature from 50° to 200° C. in the presence of ultra-violet light.

21. A method for causing a silane of the general formula

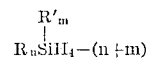

wherein R is an aryl group, R' is an alkyl group, $n$ is an alkyl group, $n$ is an integer from 1 to 3 inclusive, $m$ is an integer from 0 to 2 inclusive and $n+m$ is equal to no more than 3, to undergo rearrangement, said method comprising subjecting said silane at a temperature of not more than 200° C. to the action of an electromagnetic radiation free radical generator.

22. A method for causing a mixture of silanes having the formulas $R_xSiR'_m$ and $R'_mSiH_y$ wherein R is an aryl group, R' is an alkyl group, $m$ is an integer from 0 to 2 inclusive, $x$ is an integer from 2 to 4 inclusive and $y$ is an integer from 2 to 4 inclusive, to undergo rearrangement, said method comprising subjecting said mixture of silanes at a temperature of not more than 200° C. to the action of an electromagnetic radiation free radical generator.

References Cited

UNITED STATES PATENTS 2,732,282  1/1956  Bailey et al. _____ 260—448.2 X

OTHER REFERENCES

Chemical Abstract, vol. 52 (1958) 16260(h) to 16261(a).

Journal of American Chemical Society, vol. 77 (1955) p. 6395.

JOHN H. MACK, *Primary Examiner.*

HOWARD S. WILLIAMS, *Examiner.*